United States Patent [19]

Grosso

[11] 4,077,463

[45] Mar. 7, 1978

[54] CAUSTIC COOLING SYSTEM

[75] Inventor: Philip Grosso, Lafayette, Calif.

[73] Assignee: Kaiser Aluminum & Chemical Corporation, Oakland, Calif.

[21] Appl. No.: 751,303

[22] Filed: Dec. 16, 1976

[51] Int. Cl.² .......................................... B01D 1/00

[52] U.S. Cl. ............................ 165/1; 159/DIG. 34; 165/108

[58] Field of Search .................................. 165/1, 108; 159/DIG. 34

[56] References Cited

U.S. PATENT DOCUMENTS 3,963,424  6/1976  Bella ........................ 159/DIG. 34 X Primary Examiner—Alan Cohan
Assistant Examiner—Gerald A. Michalsky Attorney, Agent, or Firm—Paul E. Calrow; Andrew E. Barlay

[57] ABSTRACT

An improved cooling system is provided for hot, aqueous caustic solutions, such as received from evaporators employed for the concentration of electrolytically produced dilute caustic solutions. The improved cooling system consists of at least one closed loop circuit in which the hot caustic solution circulates under pressure and in the absence of air. The circuit includes suitable heat exchanger means, for example, a shell and tube device or other known heat transfer apparatus. The novel system not only allows the maintenance of controlled cooling rates, reduces scale formation on heat exchanger surfaces, improves caustic yield and quality due to lessening of carbonate formation but also improves the energy balance of the evaporation process.

3 Claims, 3 Drawing Figures

PRIOR ART COOLING SYSTEM FOR CAUSTIC SOLUTIONS

CAUSTIC COOLING SYSTEM

BACKGROUND OF THE INVENTION

The present invention relates to an improved cooling system employed for cooling of hot, aqueous caustic solutions, such as obtained in the evaporative concentration of electrolytically produced dilute caustic solutions. In the production of caustic solutions by electrolysis of aqueous brines, generally a relatively dilute caustic solution is obtained. This aqueous caustic solution frequently has only a 15–20% caustic content and is unsuited for most uses. Thus, it needs to be concentrated to a commercially acceptable concentration, usually up to a 40–55% caustic level. Evaporative concentration is the most commonly employed process for the removal of a desired portion of the water content of the solution and this is generally accomplished by heating the dilute caustic solution to about 100°–150° C. The concentrated, hot caustic exiting from the evaporator is generally cooled to a temperature at which it can be handled, but more importantly, cooling is applied to reduce the solubility of caustic-soluble impurities. At lower temperatures, a significant quantity of the dissolved impurities will precipitate and can then be removed from the caustic solution by conventional solid-liquid separation methods.

Cooling of the hot caustic solution has been generally accomplished in agitated, open vessels or tanks equipped with coils through which a cooling medium, usually water, is conducted. For optimum operating efficiency, several series-connected tanks or vessels have been used and the caustic solution temperature has been gradually reduced from vessel to vessel until it reached the desired range.

In the prior art cooling system, such as described above, rapid precipitation of a portion of the dissolved impurities occurs in the first cooling tank with consequent scale formation on the cooling coil surfaces. The scale on the coil surfaces has been found to rapidly increase to such an extent that heat transfer from the coil surfaces to the hot caustic solution is seriously impeded and the cooling rate is decreased to an unacceptable low degree. At this point under usual plant practice, this tank is bypassed and after removal of a significant portion of its caustic content, water is added to the tank. This will cause the dissolution of the deposited scale with the simultaneous generation of a dilute caustic solution. The solution thus obtained is generally recycled to the evaporator to remove the added water content and to recover the caustic values.

In addition to the rapid scale formation in the first vessel, contact of the hot caustic with $CO_2$ in the air causes carbonate formation which not only contaminates the caustic solution to be cooled, but also reduces the yield of caustic. Thus, it can be seen that the prior art cooling system employed for the cooling of caustic solutions presents many problems which renders the process not only economically undesirable but also energy intensive as a result of the frequent need of recycling and evaporating the salt-containing dilute caustic from the cooling vessel.

It has now been found that these difficulties can be readily overcome by employing a novel cooling system consisting of at least one closed-loop cooling circuit in which the hot caustic solution to be cooled is circulated under pressure in the absence of air. In this system, the rate of caustic flow can be controlled in such a manner as to obtain a desired degree of cooling at a significantly reduced rate of scaling. Due to the use of a closed, air-free system, reaction of the hot caustic with the $CO_2$ content of the atmosphere is prevented, thus the yield and quality of cooled caustic is improved. Further, since the rate of cooling in the heat exchanger employed is controllable, the rate of scale formation can also be controlled, and, consequently, the frequency of scale dissolution from the heat exchanger surfaces can be reduced which results in evaporation energy savings.

BRIEF SUMMARY OF THE INVENTION

A closed-loop, pressurized cooling system is provided for the cooling of hot, aqueous caustic solutions containing dissolved brine impurities which upon cooling tend to deposit on the surfaces of the cooling system. The novel system consists of a shell and tube heat exchanger or similar device through which the hot caustic solution is circulated at a relatively high flow rate to obtain a predetermined temperature drop across the heat exchanger tubes. Since the system employs high flow rates and cooling is accomplished by constant recycle of the caustic solution through the heat exchanger, scaling will be significantly reduced with corresponding improved operational efficiency. Due to the use of a closed system, carbonate formation is avoided, resulting in improved caustic quality and yield.

DETAILED DESCRIPTION OF THE INVENTION

This invention relates to an improved cooling system for hot, aqueous caustic solutions, such as obtained by the evaporative concentration of dilute, aqueous NaOH solutions resulting from the electrolytic decomposition of brines. More particularly, it concerns a closed-loop pressurized cooling circuit, which allows the controlled cooling of hot caustic solutions without formation of excessive scale on the heat-exchanger surfaces. Utilization of the system, due to the positive pressure in the cooling circuit, prevents contact of the hot caustic solution with the carbon dioxide content of the atmosphere and thus reduces the possibility of carbonate formation and provides a cooled caustic solution of improved purity and increased yield. Further, as a result of the reduced scale formation, frequency of cleaning is decreased with corresponding savings in time and expense. Since formed scale is generally dissolved with water and this dilute solution is recycled to the evaporative concentration step, due to the reduced volume of dilute solution generated important energy savings are also realized.

Figure 1:
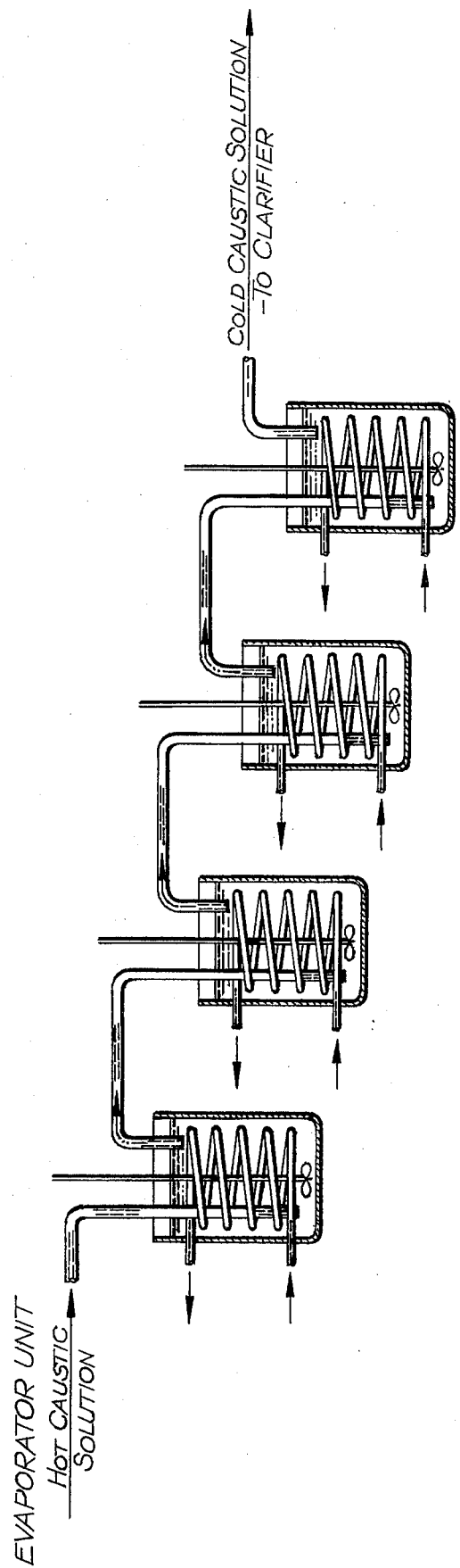
FIG. 1 shows schematically the prior art cooling system for hot caustic solutions employing a set of series-connected, agitated cooling vessels equipped with internal cooling coils.

To demonstrate the novel aspects of the instant invention, the operation and functions of the conventional cooling system will be first described with reference to FIG. 1. In a conventional cooling system, hot caustic of approximately 110°–150° C is discharged from an evaporator unit and is introduced into an open vessel equipped with internal cooling coils and an agitator. The cooling coils are supplied with a suitable cooling medium, generally water, and after a predetermined residence time under agitation, the caustic solution, having now a lower temperature, is introduced into the second vessel of a series-connected cooling system where the cooling process is continued. The number of vessels in the conventional cooling system depends on the cooling efficiency of the coils, the flow rate from the evaporator per unit time and also on the desired final temperature of the cooled caustic solution. The caustic solution is generally transferred from one vessel to another by gravity flow, in many systems, such as shown in FIG. 1, transfer occurs by overflow. As the hot caustic enters the first vessel of the series-connected cooling system, due to the temperature drop obtained by the use of the cooling coils, precipitation of dissolved impurities occurs as a result of the decreased solubility. The precipitated salts preferentially scale the outside surface of the cooling coils, scale formation on the vessel walls is less prominent due to the agitation usually employed. Agitation of the hot caustic in the open vessel causes a constant liquid-air contact, and it is well known that hot caustic solutions, when in contact with the $CO_2$ content of the atmosphere, tend to rapidly form carbonates. The caustic-$CO_2$ reaction not only causes further solids formation but also reduces the overall economy of the process due to loss of caustic in the form of insoluble carbonates. Carbonate precipitation in this vessel adds to the scale formation, thus causing rapid loss of heat exchange capacity through the scaled surfaces of the cooling coils. Consequently, when it is noticed that the temperature of the caustic solution discharged from the first vessel is not reduced by a predetermined degree, this vessel is bypassed for cleaning purposes and after removal of a large portion of the remaining caustic from this vessel, sufficient water is added to dissolve the scale accumulated on the coil and vessel surfaces. The dilute solution obtained cannot be discharged to any natural receiving body and is recycled to the evaporator. Evaporation of this additional solution consumes energy rendering the process unnecessarily energy intensive. The cooling process is continued through the entire set of vessels and although precipitation of scale on cooling coil surfaces is less pronounced as the caustic solution temperature is decreased, bypassing and cleaning of each vessel of the series becomes necessary. Consequently, the conventional caustic cooling train requires a large number of vessels in order to allow continuous and uninterrupted cooling of the electrolytically produced and evaporatively concentrated caustic. For a plant producing in the neighborhood of about 200–400 tons/day concentrated caustic, the cooling train may consist of 4 to 7 vessels requiring significant space among the other difficulties discussed above.

Contrary to the conventional cooling systems, such as shown in FIG. 1 and described in detail above, the instant invention provides a novel and efficient way to overcome the difficulties presented by the prior art.

Figure 2:
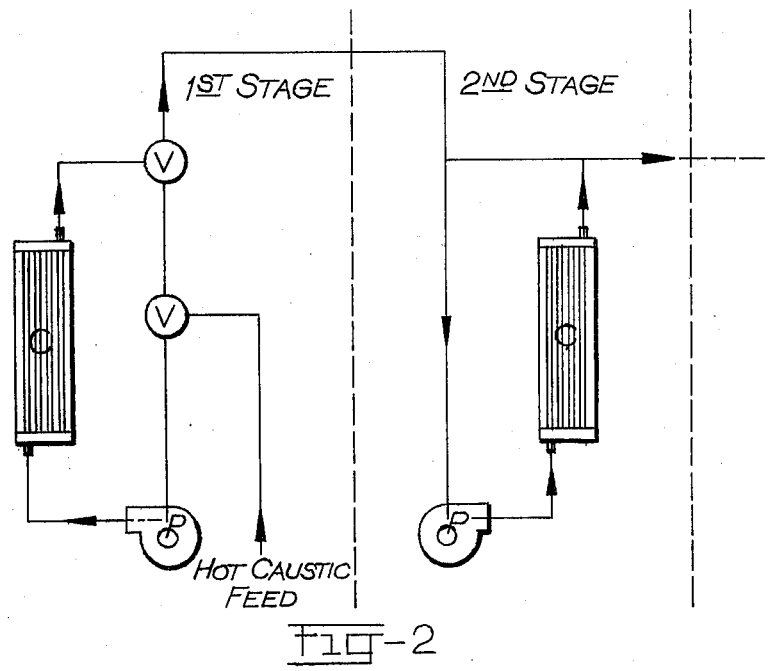
FIG. 2 presents a schematic diagram of the closed-loop cooling system of the instant invention employing a shell and tube heat exchanger.

As shown in FIG. 2, the present invention employs a closed-loop, pressurized cooling system, wherein cooling of the hot caustic feed is accomplished by pumping the solution through a suitable heat-exchanger device, for example, a shell and tube heat-exchanger. The use of the instant pressurized, closed-loop cooling system, provides the following advantages over the conventionally employed open vessels.

In the closed-loop cooling system employing a shell and tube heat exchanger, the flow of the hot caustic solution can be controlled at any desired rate and as a result the temperature difference ($\Delta T$) between the stream entering and leaving the tubes of the shell and tube heat exchanger can be maintained at a predetermined value.

By using a relatively high flow rate through the tubes during cooling of the hot caustic, deposition of the precipitate on the inner walls of the tubes will be significantly reduced, thus the heat-exchange capacity of the system can be maintained for a considerably longer time period than in the open vessel cooling system.

As a consequence of the decreased rate of scale formation, the frequency of cleaning operations is reduced with corresponding reduction in the dissolved scale volume to be recycled to the evaporator. By extending the operational life of the cooling system, considerable time and effort can be saved which results in the improvement of the overall efficiency of the caustic production process. Energy savings will also result due to the less frequent need for dissolving accumulated scale and the reduced volume of diluted caustic to be recycled to the evaporation process.

The use of a closed-loop, pressurized cooling system, provides additional important advantages. Contact with the carbon dioxide content of the atmosphere will be minimized. Thus, carbonate formation will be significantly reduced resulting in quality improvement and increased yield.

Since the instant cooling system requires considerably less space than the conventional cooling train, in addition to the above enumerated advantages, the cooling section of a caustic production plant employing the closed-loop system can be considerably smaller, thus freeing area for other uses.

Figure 3:
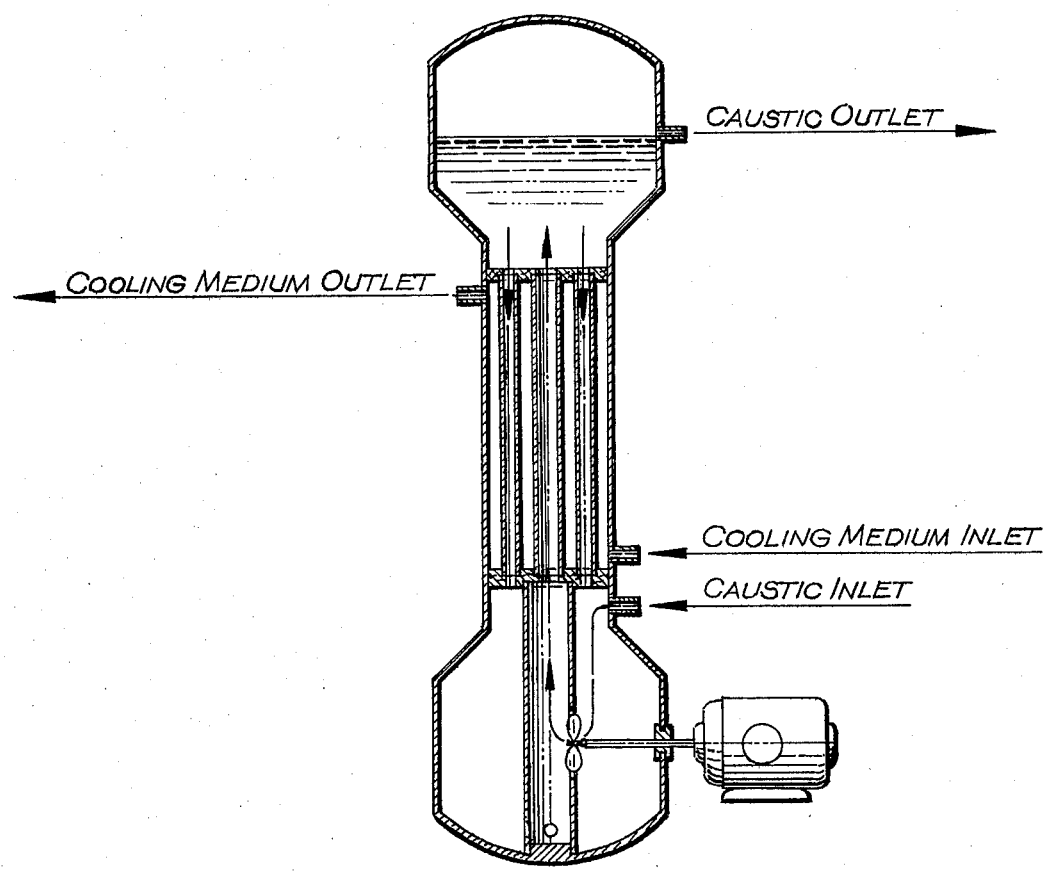
FIG. 3 shows an integral pump and heat exchanger device which can be employed in lieu of the shell and tube cooler of FIG. 2.

The instant cooling system is not limited to the use of a shell and tube type heat-exchanger device. For example, as shown in FIG. 3, an integral pump-cooler can also be successfully employed for the cooling of hot, aqueous caustic solutions. Other suitable heat-exchangers can also be utilized, provided they allow the control of the flow rate of the caustic through the system with a corresponding control of the $\Delta T$ across the cooling system.

In addition, the selection of the number of closed-loop cooling circuits employed for cooling the hot caustic can be simply chosen based on the throughput desired, the temperature at which the caustic enters the system and the temperature desired from the caustic discharged from the system. The instant system requires at least one cooling circuit, preferably at least two units should be provided. This allows uninterrupted operation even if one of the circuits is to be bypassed for descaling of the heat-exchanger surfaces.

To further illustrate the novel aspects of the invention, the following example is provided.

EXAMPLE

A conventional caustic cooling system, consisting of 7 series-connected agitated open vessels equipped with cooling coils, was first employed for cooling hot, aqueous caustic (NaOH) solution discharged from a multi-effect evaporating apparatus. The aqueous caustic solution had an NaOH concentration of about 45 to 55% by weight, it had a temperature in the range of about 85° to 95° C, and it contained 2.7% by weight dissolved NaCl. The hot caustic solution was charged to the first vessel of the cooling train at a rate of 504 liters/min (133 gallons/min) and cooling water was conducted through the coils at the rate of 2274 liters/min (600 gallons/min). The cooling water temperature at entry in the coil was about 29° C, and it was discharged from the coil at a temperature of about 33° C. The caustic solution discharged by overflow from the first vessel to the second vessel of the cooling train after an average residence time of about 1 hour had a temperature of about 74° C. Cooling continued in the series-connected system until the caustic solution temperature was reduced to about 26° C.

The first vessel of the train had to be bypassed after about 24–36 hours of operation due to the heavy scaling of the cooling coils causing decreased cooling efficiency indicated by reducton of T. The value of $\Delta T$ is calculated by using the formula $T_1 - T_2 = \Delta T$, where $T_1$ is the temperature of the hot caustic charged to the cooling vessel and $T_2$ is the temperature of the caustic discharged after the predetermined residence time.

In order to maintain the efficiency of the cooling system and assure the running of the plant, an additional open vessel had to be provided in lieu of the bypassed vessel which underwent cleaning.

To indicate the improved efficiency of the novel cooling system, hot caustic solution discharged from a multi-effect evaporator was also cooled in a closed-loop, pressurized circuit. The circuit consisted of a shell and tube heat-exchanger, the shell being of approximately 3.65 meters in height and having a diameter of approximately 0.61 meter. The shell housed approximately 64 tubes of about 5.1 cm outer diameter (16 bung) and of 91.4 cm length, providing a cooling surface of about 37.1 m².

Hot caustic of approximately 72° C temperature was continuously pumped through the heat-exchanger at a rate of about 15,141 liter/minute (4000 gallons/min) and at a pressure of about 1.44 atmospheres (6.5 psig). The $\Delta T$, i.e., the temperature difference between the temperature of the caustic entering the heat-exchanger and the temperature of the caustic discharged from the heat-exchanger was kept at about 0.56° C (1° F), by the rapid throughput rate. A portion of the cooled caustic was continuously discharged into a second closed-loop circuit, while the major portion (approximately 97% of the total volume) was recycled through the first shell and tube heat-exchanger. Cooling of the caustic solution was continued in the first circuit until a drop in $\Delta T$ indicated that efficiency of cooling was decreased due to scaling of the internal surfaces of the tubes. This was observed after a 168 hour operation period. The volume of hot caustic cooled in the closed-loop, pressurized system without requiring bypass and descaling of the shell and the tube heat-exchanger amounted to 600 tons/day. By comparing these results with the cooling efficiency of the above-described conventional system, it becomes clear that the novel cooling system operates far more efficiently than the conventionally employed open vessel cooling trains.

In addition to the advantages shown hereinbefore, the scaled surfaces of the shell and tube heat-exchanger can be cleaned more rapidly than the coils and walls of the open vessel system. This is due to the pressurized flow of cleaning solution through the tubes, which at relatively high Reynolds numbers, e.g., above about 2500, causes a turbulent flow in the system which aids the dissolution of the precipitated salts.

As far as the purity of the cooled caustic solution is concerned, the carbonate content of the caustic removed from the closed-loop cooling system was found to be essentially the same as the carbonate level of the hot, incoming stream. This, in addition to maintaining a constant quality, improves the yield of caustic production due to the elimination of undesired carbonate formation.

While there have been shown and described hereinabove possible embodiments of the invention, it is to be understood that various changes, alterations and modifications can be made thereto without departing from the spirit and scope thereof as defined in the appended claims.

What is claimed is:

1. In the process of cooling hot, aqueous caustic solutions resulting from the evaporation of dilute, electrolytically produced aqueous caustic solutions, the improvement which comprises introducing the hot caustic solution into a cooling system consisting of at least one closed-loop circuit, the circuit consisting of a heat-exchanger device and suitable means to circulate the caustic solution through the heat-exchanger; continuously circulating the caustic solution through the heat-exchanger device under pressure and in the absence of air until the temperature of the caustic solution is reduced to a desired lower temperature; continuously discharging at least a portion of the cooled caustic solution, while supplying the cooling system with fresh, hot caustic solution in a volume approximately corresponding to the volume of cooled caustic removed from the closed-loop circuit.

2. Process according to claim 1, wherein the cooling system consists of at least two closed-loop circuits and wherein the caustic solution discharged from the first circuit is continuously introduced into the second circuit for continuation of the cooling process and caustic solution of further decreased temperature is discharged from the second cooling circuit.

3. Process according to claim 1, wherein the heat-exchanger device is a closed shell and tube device.

* * * * *